US009814008B2

(12) United States Patent
Nistor

(10) Patent No.: US 9,814,008 B2
(45) Date of Patent: Nov. 7, 2017

(54) METHODS, SYSTEMS, AND COMPUTER READABLE MEDIA FOR RECEIVING A CLOCK SYNCHRONIZATION MESSAGE

(71) Applicant: Ixia, Calabasas, CA (US)

(72) Inventor: Marius Pavel Nistor, Bucharest (RO)

(73) Assignee: IXIA, Calabasas, CA (US)

( * ) Notice: Subject to any disclaimer, the term of this patent is extended or adjusted under 35 U.S.C. 154(b) by 152 days.

(21) Appl. No.: 14/572,746

(22) Filed: Dec. 16, 2014

(65) Prior Publication Data

US 2016/0174178 A1 Jun. 16, 2016

(30) Foreign Application Priority Data

Dec. 15, 2014 (RO) .................................... 14-00985

(51) Int. Cl.
*H04W 56/00* (2009.01)
*H04L 29/08* (2006.01)
(Continued)

(52) U.S. Cl.
CPC ......... *H04W 56/0015* (2013.01); *H04L 63/00* (2013.01); *H04L 67/10* (2013.01);
(Continued)

(58) Field of Classification Search
CPC ......... H04L 43/08; H04L 67/10; H04L 63/00; H04L 43/0858; H04L 43/50;
(Continued)

(56) References Cited

U.S. PATENT DOCUMENTS 6,381,218 B1 4/2002 McIntyre et al.
8,065,418 B1 11/2011 Abuan et al.
(Continued)

FOREIGN PATENT DOCUMENTS

WO WO 03/069493 A1 8/2003
WO WO 2016/130280 A1 8/2016

OTHER PUBLICATIONS

Notification of Transmittal of the International Search Report and the Written Opinion of the International Searching Authority, or the Declaration for International Application No. PCT/US2016/013827 (dated May 2, 2016).

(Continued)

*Primary Examiner* — Charles C Jiang
*Assistant Examiner* — Oussama Roudani
(74) *Attorney, Agent, or Firm* — Jenkins, Wilson, Taylor & Hunt, P.A.

(57) ABSTRACT

Methods, systems, and computer readable media for receiving a clock synchronization message are disclosed. According to one exemplary method, the method occurs at a first node configured to operate on a protected side of a firewall device. The method includes sending, via the firewall device and to a second node configured to operate on a non-protected side of the firewall device, a clock lease message indicating an amount of time for clock synchronization, wherein the clock lease message triggers the firewall device to allow a clock synchronization message from the second node to the first node. The method also includes receiving, via the firewall device and from the second node, the clock synchronization message.

21 Claims, 4 Drawing Sheets

(51) Int. Cl.
*H04L 29/06* (2006.01)
*H04L 12/26* (2006.01)
*H04L 12/24* (2006.01)

(52) U.S. Cl.
CPC ...... *H04L 41/5038* (2013.01); *H04L 41/5067* (2013.01); *H04L 43/087* (2013.01); *H04L 43/0858* (2013.01); *H04L 43/50* (2013.01)

(58) Field of Classification Search
CPC ............. H04L 41/5038; H04L 41/5067; H04L 43/087; H04W 56/001; H04W 56/0015
See application file for complete search history.

(56) References Cited

U.S. PATENT DOCUMENTS

| | | |
|---|---|---|
| 9,052,941 B1 | 6/2015 | Bone |
| 9,608,906 B2 | 3/2017 | Constantinescu et al. |
| 9,680,877 B2 | 6/2017 | Duffield |
| 9,769,291 B2 | 9/2017 | Nistor et al. |
| 2004/0240468 A1 | 12/2004 | Chin et al. |
| 2005/0076235 A1 | 4/2005 | Ormazabal et al. |
| 2005/0226194 A1 | 10/2005 | Fan et al. |
| 2006/0062203 A1 | 3/2006 | Satapati |
| 2007/0213966 A1 | 9/2007 | Noble |
| 2007/0283002 A1 | 12/2007 | Bornhoevd et al. |
| 2008/0072312 A1 | 3/2008 | Takeyoshi et al. |
| 2009/0040942 A1* | 2/2009 | Yang ............... H04L 12/2602 370/253 |
| 2009/0077245 A1* | 3/2009 | Smelyansky ..... H04L 29/12509 709/228 |
| 2009/0154363 A1 | 6/2009 | Stephens |
| 2010/0183151 A1* | 7/2010 | Wing ................ H04L 63/029 380/257 |
| 2011/0010413 A1 | 1/2011 | Christenson et al. |
| 2011/0187864 A1* | 8/2011 | Snider ................. H04N 7/18 348/158 |
| 2012/0054491 A1 | 3/2012 | Tippett |
| 2012/0075439 A1* | 3/2012 | Gong .................. H04N 5/247 348/61 |
| 2012/0078547 A1* | 3/2012 | Murdoch ............ G01D 4/004 702/62 |
| 2013/0272322 A1* | 10/2013 | Sagarwala .......... H04J 3/0667 370/508 |
| 2014/0280901 A1 | 9/2014 | Balachandran et al. |
| 2014/0310397 A1 | 10/2014 | Tseng et al. |
| 2016/0156541 A1 | 6/2016 | Nistor et al. |
| 2016/0173444 A1 | 6/2016 | Nistor |
| 2016/0234113 A1 | 8/2016 | Constantinescu et al. |
| 2016/0234163 A1 | 8/2016 | Nistor et al. |
| 2016/0248795 A1 | 8/2016 | Chien |

OTHER PUBLICATIONS

Commonly-assigned, co-pending U.S. Appl. No. 14/619,039 for "Methods, Systems, and Computer Readable Media for Identifying Network Locations Associated with Endpoints," (Unpublished, filed Feb. 10, 2015)

Commonly-assigned, co-pending U.S. Appl. No. 14/619,041 for "Methods, Systems, and Computer Readable Media for Facilitating the Resolving of Endpoint Hostnames in Test Environments with Firewalls, Network Address Translators (NATs), or Clouds," (Unpublished, filed Feb. 10, 2015).

Commonly-assigned, co-pending U.S. Appl. No. 14/574,359 for "Methods, Systems, and Computer Readable Media for Initiating and Executing Performance Tests of a Private Network and/or Components Thereof," (Unpublished, filed Dec. 17, 2014).

Commonly-assigned, co-pending U.S. Appl. No. 14/557,418 for "Methods, Systems, and Computer Readable Media for Receiving Test Configuration Information," (Unpublished, filed Dec. 1, 2014).

"UDP hole punching," Wikipedia, http://en.wikipedia.org/wiki/UDP—hole—punching, (Nov. 25, 2014).

Marius Pavel Nistor, "Application Mixes Add New Levels of Realism to IxChariot 8 Network Testing," Ixia, (Aug. 1, 2014).

Notice of Allowance and Fee(s) Due for U.S. Appl. No. 14/619,039 (dated Nov. 7, 2016).

Non-Final Office Action for U.S. Appl. No. 14/619,039 (dated Jul. 13, 2016).

Notice of Allowance and Fee(s) Due for U.S. Appl. No. 14/619,041 (dated May 9, 2017).

Non-Final Office Action for U.S. Appl. No. 14/574,359 (dated Jan. 17, 2017).

Non-Final Office Action for U.S. Appl. No. 14/619,041 (dated Dec. 16, 2016).

Communication of European publication number and information on the application of Article 67(3) EPC for European Patent Application No. 16749568.8 (Aug. 23, 2017).

Final Office Action for U.S. Appl. No. 14/574,359 (Jul. 27, 2017).

Non-Final Office Action and Fee(s) Due for U.S. Appl. No. 14/557,418 (Sep. 27, 2017).

* cited by examiner

METHODS, SYSTEMS, AND COMPUTER READABLE MEDIA FOR RECEIVING A CLOCK SYNCHRONIZATION MESSAGE

PRIORITY CLAIM

This application claims the benefit of Romanian Patent Application No. A/00985/2014, filed Dec. 15, 2014; the disclosure of which is incorporated herein by reference in its entirety.

TECHNICAL FIELD

The subject matter described herein relates to clock synchronization. More specifically, the subject matter relates to methods, systems, and computer readable media for receiving a clock synchronization message.

BACKGROUND

Network operators typically test network nodes for reliability and other characteristics before deploying the network nodes in live (e.g., non-test) and/or protected networks, e.g., private networks protected by one or more security related devices, such as a firewall and/or a network address translator (firewall/NAT). While testing a network node before deployment may be beneficial, scenarios exist where testing a network node in a live and/or protected network is useful and/or necessary, e.g., for detecting and/or resolving previously undetected issues. However, issues can arise when attempting to configure network nodes for testing in a live and/or protected network. In particular, configuring network nodes for testing in a live and/or protected network may create or exacerbate security concerns since a test operator may need to traverse a firewall/NAT to communicate with the network nodes.

Traffic related measurements, such as one way delay, jitter, mean opinion score (MOS), are typically dependent on clock synchronization between two endpoints, e.g., a sender and a receiver. Conventional techniques for synchronizing clocks in a live and/or protected network involve using external sources for synchronization, such as a global positioning system (GPS) or a network time protocol (NTP) server. However, these techniques can have significant drawbacks or issues. For example, deployment can be tedious and errors prone because such techniques generally require significant modifications to the endpoints and/or network architecture. Further, when using a public NTP server to synchronize, such techniques may yield a lack of precision because the round-trip time required to synchronize endpoints' clocks with the NTP server will be doubled compared to a scenario where the endpoints communicate directly.

Accordingly, a need exists for improved methods, systems, and computer readable media for receiving a clock synchronization message.

SUMMARY

Methods, systems, and computer readable media for receiving a clock synchronization message are disclosed. According to one exemplary method, the method occurs at a first node configured to operate on a protected side of a firewall device. The method includes sending, via the firewall device and to a second node configured to operate on a non-protected side of the firewall device, a clock lease message indicating an amount of time for clock synchronization, wherein the clock lease message triggers the firewall device to allow a clock synchronization message from the second node to the first node. The method also includes receiving, via the firewall device and from the second node, the clock synchronization message.

According to one exemplary system, the system includes a first node configured to operate on a protected side of a firewall device. The first node comprises a clock synchronization engine configured to send, via the firewall device and to a second node configured to operate on a non-protected side of the firewall device, a clock lease message indicating an amount of time for clock synchronization, wherein the clock lease message triggers the firewall device to allow a clock synchronization message from the second node to the first node and to receive, via the firewall device and from the second node, the clock synchronization message.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors, network interfaces, and memory.

As used herein, the term 'clock' refers to any entity (e.g., software, hardware, and/or firmware) for observing, maintaining, providing, or storing time or passage thereof.

As used herein, each of the terms 'function', 'engine', and 'module' refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
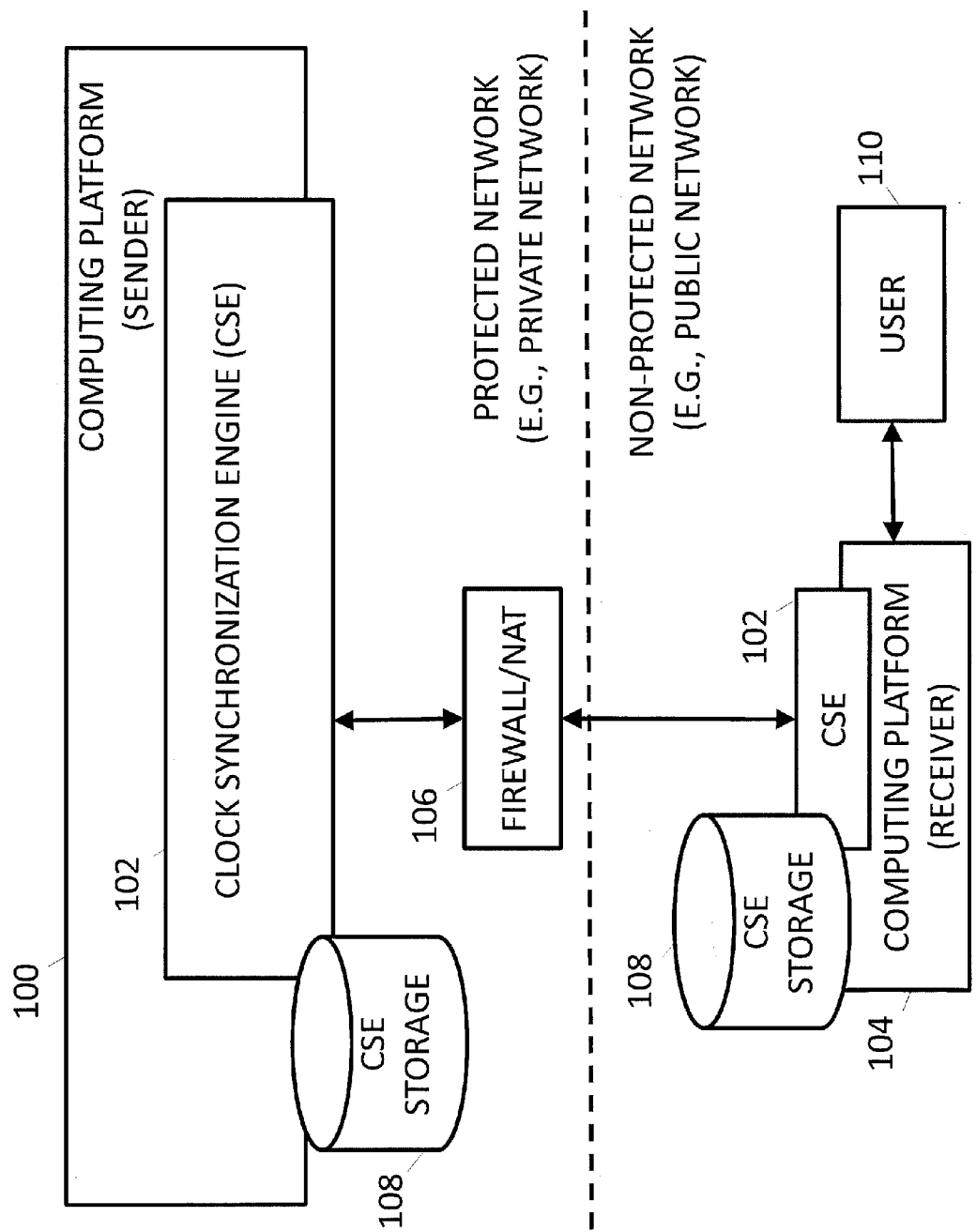
FIG. 1 is a diagram illustrating an exemplary computing platform for receiving a clock synchronization message according to an embodiment of the subject matter described herein.

The subject matter described herein includes methods, systems, and computer readable media for receiving a clock synchronization message. When preparing to test network nodes, test operators typically need to synchronize clocks of test nodes and a test platform to accurate determine and/or measure traffic related statistics. For example, a receiver node (e.g., a device or endpoint) for receiving streaming traffic may be responsible for performing various traffic related measurements, such as one way delay or jitter. To perform accurate traffic related measurements, a receiver node may need to perform clock synchronization with one more sender nodes that send the streaming traffic. Depending on clock drift and/or other information associated with a given node and/or an associated communications path, from time to time, the receiver node may send some messages (e.g., datagrams) to and receive messages from the sender nodes so that the receiver node can synchronize its clock and determine when to synchronize again. However, issues can arise when a sender node is located in a different network from the receiver node, especially when security devices, such as a firewall and/or network address translator (firewall/NAT), control traffic sent between the networks. For example, if a sender node is located behind a firewall/NAT in a protected enterprise network, a receiver node may be unable to send datagrams to the sender node, thereby preventing the synchronization of clocks and resulting in inaccurately, erroneous, and/or futile traffic related measurements.

In accordance with some aspects of the subject matter described herein, techniques for performing clock synchronization or aspects thereof may include using various mechanisms (e.g., a leasing mechanism based on sending messages from a sender located inside a protected network to a receiver located in a non-protected network, sending unique identifiers for endpoints in exchanged messages to correlate the sender and receiver and to avoid potential non-unique identifiers, such as Internet protocol (IP) addresses, using a hole punching technique at a security device for sending messages (e.g., user datagram protocol (UDP) datagrams) from an outside peer to an inside peer) so that clock synchronization related messages can traverse security related devices (e.g., a firewall/NAT) to reach appropriate endpoints. For example, an endpoint in a protected network may send a clock lease message to a receiver in a non-protected network. In this example, the clock lease message may trigger an intermediate security device (e.g., a firewall/NAT) to allow clock synchronization related messages from a non-protected network to traverse a protected network.

Advantageously, in accordance with some aspects of the subject matter described herein, clock synchronization may be utilized by network nodes in a live and/or protected network by triggering a security device to allow clock synchronization related messages to traverse a protected network from a non-protected network. For example, a receiver located in a non-protected network (e.g., a public 'cloud' service network) may synchronize its clock(s) with one or more senders of streaming traffic located in a protected network and may accurately measure the streaming related statistics in an agnostic way with respect to related firewall/NAT configuration and without the necessity of changing a protected network's security infrastructure. Further, such techniques may be used without requiring any external hardware or software to perform clock synchronization.

Advantageously, in accordance with some aspects of the subject matter described herein, a node or endpoint (e.g., a test platform) performing traffic related measurements may synchronize its clocks with nodes in the live and/or protected network, thereby simplifying and/or minimizing modifications to the nodes in the live and/or protected network. Synchronizing a clock at a node or endpoint in a non-protected network that performs traffic related measurements to a node or endpoint in a live and/or protected network is believed to be novel and advantageous over conventional techniques that use a public NTP server where the endpoints in the protected network synchronize their clocks with the public NTP server.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary computing platform 100 for receiving a clock synchronization message according to an embodiment of the subject matter described herein. Referring to FIG. 1, a protected network may include a computing platform 100 and a non-protected network may include a computing platform 104.

Each of computing platforms 100 and 104 may represent a network device, a network module, a node, or a system of devices, nodes, and/or modules. For example, computing platform 100 may be an endpoint located behind one or more security related devices, such as a firewall/NAT, in a protected network (e.g., a private test network or an enterprise network). In some embodiments, each of computing platforms 100 and 104 may be a single node or may include functionality distributed across multiple computing platforms or nodes.

In some embodiments, computing platforms 100 and/or 104 may include a traffic generator and may emulate one or more network nodes. For example, computing platform 100 may be configured to emulate a web server and/or a user device and may generate test traffic (e.g., messages and/or packets) associated with these nodes.

Computing platform 100 may communicate (e.g., directly and/or indirectly) with computing platform 104. In some embodiments, computing platform 104 may represent a node or device that includes functionality for testing various aspects of computing platform 100 and/or other nodes. For example, computing platform 104 may receive test traffic generated by computing platform 100 and may generate traffic related measurements, such as jitter and one way delay, associated with the traffic from computing platform 100.

In some embodiments, computing platform 104 may include functionality for communicating with various entities. For example, computing platform 104 may provide a communications interface or console for communicating with user 110. In some embodiments, user 110 may be an automated system or may be controlled or controllable by a human user. User 110 may select and/or determine traffic related measurements to perform, clock synchronization preferences, and/or other configurations via one or more user interfaces associated with computing platform 104.

In some embodiments, computing platform 104 may include one or more modules for performing clock synchronization or aspects thereof. For example, computing platform 104 may be configured to receive a clock lease message from computing platform 100 for indicating an amount of time for clock synchronization (e.g., the lease time may indicate how long computing platform 104 may send clock synchronization messages to computing platform 100. In this example, after receiving the clock lease message, computing platform 104 may generate and send a clock synchronization message to computing platform 104. Continuing with this example, computing platform 100 may generate and send a clock synchronization reply message containing clock related information to computing platform 104.

In some embodiments, communications to or from computing platform 104 and/or computing platform 100 may traverse firewall/NAT 106. Firewall/NAT 106 may represent any security related entity, such as a firewall device and/or a NAT device, which may block, alter, and/or discard some communications that traverse the security related entity. For example, firewall/NAT 106 may discard or block incoming messages from nodes located in an outside (e.g., non-protected) network unless firewall/NAT 106 is instructed or otherwise configured to allow certain communications, e.g., during a particular period of time and/or using a particular port associated with a particular IP address.

In some embodiments, communications from or to computing platform 104 and/or computing platform 100 may occur without modifying configurations associated with security related devices in a live and/or protected network. For example, a trigger message from computing platform 100 may trigger firewall/NAT 106 to allow clock synchronization messages from and/or to computing platform 104 for a limited time. In this example, the trigger message may be in lieu of a network operator configuring firewall/NAT 106 to allow communications from computing platform 104.

Each of computing platform 100 and/or computing platform 104 may include, utilize, and/or access a clock synchronization engine (CSE) 102, also referable to as clock synchronization system (CSS) and a clock synchronization module (CSM). CSE 102 may represent any suitable entity or entities (e.g., a computing platform, software executing on a processor, a logic device, a module, a complex programmable logic device (CPLD), a field-programmable gate array (FPGA), and/or an application specific integrated circuit (ASIC)) for performing one or more aspects associated with clock synchronization. For example, CSE 102 may facilitate and/or perform clock synchronization before, during, or after receiving test traffic so that more accurate traffic related measurements can be obtained, derived, or determined.

In some embodiments, CSE 102 may include one or more communications interfaces for interacting with users, systems, and/or nodes. For example, CSE 102 may include one or more communications interfaces for receiving and sending various types of messages; such as IP messages, IP version 4 (v4) messages, IP version 6 (v6) messages, user datagram protocol (UDP), transmission control protocol (TCP) messages, stream control transmission protocol (SCTP) messages, real-time transport protocol (RTP) messages, or reliable data protocol (RDP) messages, general packet radio service (GPRS) tunneling protocol (GTP) messages, messages using another tunneling protocol, and/or other messages.

In some embodiments, CSE 102 may include functionality for facilitating clock synchronization by sending a clock lease message or another message to computing platform 104 via firewall/NAT 106. For example, when a clock lease message is received at firewall/NAT 106, the clock lease message may trigger firewall/NAT 106 to allow communications from computing platform 104 for a particular amount of time as indicated by a lease time in the clock lease message. In another example, when a clock lease message is received at firewall/NAT 106, the clock lease message may trigger firewall/NAT 106 to allow communications from computing platform 104 for a particular amount of time as determined by one or more preconfigured rules at firewall/NAT 106. In this example, if the amount of time firewall/NAT 106 as determined by the preconfigured rules at firewall/NAT 106 is different from a lease time in the clock lease message, firewall/NAT 106 may modify the lease time in the message and/or notify one or more entities about the difference.

In some embodiments, CSE 102 may include functionality for sending and/or receiving clock synchronization related messages. For example, CSE 102 at computing platform 104 may send a clock synchronization message for requesting clock related information, e.g., information for synchronizing a clock. In this example, in response to receiving the clock synchronization message, CSE 102 at computing platform 100 may send a clock synchronization reply message including clock related information associated with a clock at computing platform 100.

In some embodiments, CSE 102 may be configured to perform one or more clock synchronization message exchanges between computing platform 104 and computing platform 100. For example, in response to receiving clock related information from CSE 102 at computing platform 102, CSE 102 at computing platform 104 may send a new clock synchronization message unless a lease time indicated in a clock lease message has elapsed or a threshold number of exchanges are reached. In this example, after enough clock related information is obtained, CSE 102 at computing platform 104 may synchronize a clock using the clock related information.

In some embodiments, computing platform 100, computing platform 104, and/or CSE 102 may include functionality for storing and/or maintaining clock related information for one or more clocks. For example, for each node being tested, CSE 102 at computing platform 104 may maintain clock related information such that traffic related measurements are performed using a clock synchronized with the relevant node's clock related information. In some embodiments, CSE 102 may store clock related information and/or other information at CSE storage 108.

CSE storage 108 may represent any suitable entity (e.g., a non-transitory computer readable medium or a memory device) for storing data associated with message flows, messages, test traffic, test results, statistics (e.g., traffic related measurements), clock related information, and/or other information. Exemplary data stored at CSE storage 108 may include traffic related information, traffic related measurements, timers related to clock leases, clock related information (e.g., clocks associated with one or more nodes), clock synchronization preferences or settings, clock drift algorithms, and/or other information.

In some embodiments, CSE storage 108 may be integrated with or accessible by CSE 102, computing platform 100, computing platform 104, or modules therein. In some embodiments, CSE storage 108 may be located at a node distinct from CSE 102, computing platform 100, and/or computing platform 104. For example, CSE storage 108 may be associated with a storage device separate from computing platform 100, e.g., at firewall/NAT 106.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
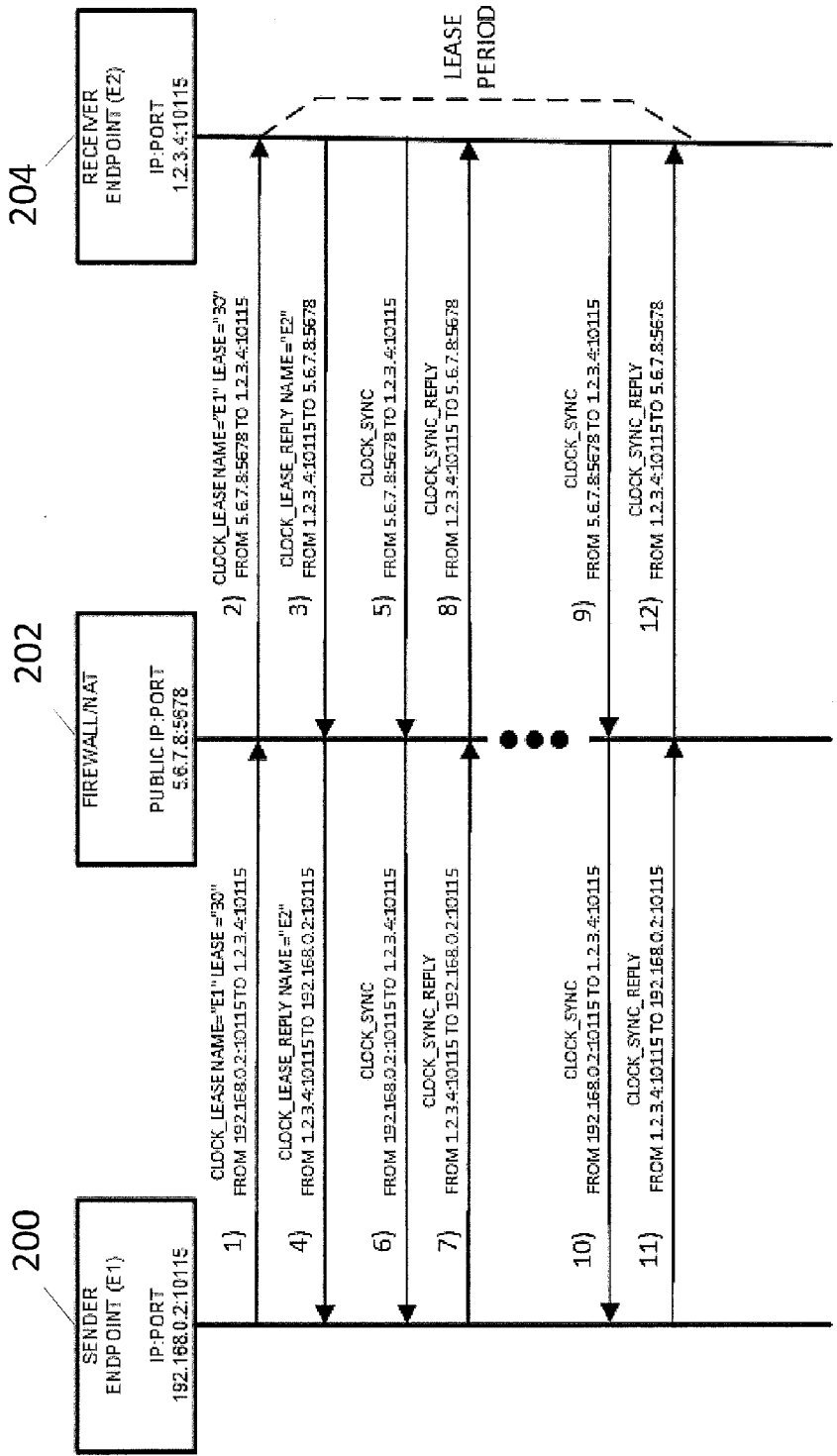
FIG. 2 is a diagram illustrating exemplary communications associated with clock synchronization according to an embodiment of the subject matter described herein.

FIG. 2 is a diagram illustrating exemplary communications associated with clock synchronization according to an embodiment of the subject matter described herein. In network testing, streaming tests usually consist of sending UDP and/or RTP datagrams at some intervals between two endpoints, e.g., a sender and a receiver. Generally, to accurately measure traffic related statistics associated with the testing, clock synchronization must occur between the two endpoints.

In some embodiments, when a security related device, such as firewall/NAT 106, is an intermediary for communications between a receiver and a sender, a leasing mechanism and/or hole punching mechanism may be utilized for triggering the security related device to allow clock synchronization related messages to be exchanged between the receiver and the sender.

In the embodiment illustrated in FIG. 2, a sender endpoint 200, a firewall/NAT 202, and a receiver endpoint 204 are depicted. Sender endpoint 200 may represent any suitable entity for sending a clock synchronization message and may be located in a live and/or protected network, e.g., a network that uses a security related device to inspect or otherwise control traffic from other (e.g., non-protected) networks. Sender endpoint 200 may also generate and send test traffic to receiver endpoint 204. For example, sender endpoint 200 may include CSE 102 and/or may include functionality similar to computing platform 100.

Firewall/NAT 202 may represent a security related device and may be configured to allow or discard communications (e.g., based on criteria or rules) between sender endpoint 200 and receiver endpoint 204. For example, firewall/NAT 202 may include functionality similar to firewall/NAT 106. In some embodiments, firewall/NAT 202 may be located in a same network as sender endpoint 200 or receiver endpoint 204.

Receiver endpoint 204 may represent any suitable entity for sending a clock synchronization reply message and/or a clock lease message. Receiver endpoint 204 may also receive test traffic from sender endpoint 200 and may perform traffic related measurements. For example, receiver endpoint 204 may include CSE 102 and/or may include functionality similar to computing platform 104 and may be located in a non-protected network.

In some embodiments, sender endpoint 200 may interact with a private-facing side of firewall/NAT 202, e.g., using a private IP address and/or a private port associated with firewall/NAT 202, and receiver endpoint 204 may interact with a public-facing side of firewall/NAT 202, e.g., using a public IP address and/or a public port associated with firewall/NAT 202.

In some embodiments, communications received via a private-facing side of firewall/NAT 202 may have different and/or additional privileges, permissions, and/or processing than communications received via a public-facing side of firewall/NAT 202. For example, communications received via a private-facing side of firewall/NAT 202 may be consider benign or authenticated and/or may not be filtered or discarded by firewall/NAT 202, while communications received via a public-facing side of firewall/NAT 202 may be consider untrustworthy or unauthenticated and/or may be inspected for determining whether the communications are to be discarded or allowed, e.g., into a protected network.

In some embodiment, firewall/NAT 202 may be configured to allow communications between sender endpoint 200 and receiver endpoint 204, e.g., in response to a trigger message (e.g., a clock lease message) from sender endpoint 200. For example, in response to sender endpoint 200 sending a clock lease message via a certain port to an outside node (e.g., a node in a non-protected network or different network from sender endpoint 200), firewall/NAT 202 may allow messages to be received from the outside node via the same port. In this example, this communications allowance or hole between sender endpoint 200 and receiver endpoint 204 may be time sensitive and/or otherwise restrictive in nature, e.g., communications may be allowed from an outside node for 30 seconds after a message sent is by sender endpoint 200 and the communications must be from the destination node in the trigger message.

In some embodiments, a hole punching mechanism may be usable for allowing communications between sender endpoint 200 and receiver endpoint 204. For example, receiver endpoint 204 may send datagrams to sender endpoint 200 via firewall/NAT 202 if sender endpoint 200 previously opened a hole in NAT device by sending a datagram to receiver endpoint 204. In this example, each endpoint may use a particular port number, endpoint identifier, and/or other information that allows firewall/NAT 202 to validate, verify, or determine that communications are to be allowed from outside a protected (e.g., private) network.

In some embodiments, sender endpoint 200 may be configured to send, via a particular port, clock synchronization related messages (e.g., datagrams) to receiver endpoint 204 and may also be configured to receive via the same port, clock synchronization related messages from receiver endpoint 204. In such embodiments, receiver endpoint 204 may be capable of inferring or determining a destination address for sending messages to sender endpoint 200 (e.g., via firewall/NAT 106).

Referring to FIG. 2, at step 1, a clock lease message may be sent from sender endpoint 200 to firewall/NAT 202. In some embodiments, a clock lease message may include node identification information, such as a unique node name, and may include a lease time indicating an amount of time for sending and/or receiving clock synchronization related messages. In such embodiments, the unique node name may be usable for identifying clock related information and/or messages associated with sender endpoint 200 and the lease time may be usable for determining when to stop a clock synchronization process.

In some embodiments, a lease time may be based on a time period that firewall/NAT 202 keeps a hole open or alive for a particular communication stream and/or how long a mapping between a private address and a public address is maintained by firewall/NAT 202. In such embodiments, the time period may be based on various factors, including preconfigured rules, operator information, historical information, and/or dynamic information.

In some embodiments, a clock lease message may be sent at different intervals by sender endpoint 200. For example, a test operator may configure clock related information, such as clock synchronization frequency, clock lease time length, and/or identifiers for identifying various endpoints and/or clocks. In another example, clock related information may be obtained or derived from preconfigured information (e.g., an initialization file), historical information, and/or dynamic information.

At step 2, the clock lease message may be sent from firewall/NAT 202 to receiver endpoint 204. For example, firewall/NAT 202 may receive a clock lease message and perform network address translation such that a reply message from receiver endpoint 204 is addressed to firewall/NAT 202. In this example, sender endpoint 200 may send a datagram including a source IP address and port '192.168.0.2:10115' associated with a private (e.g., internal) network and a destination IP address and port '1.2.3.4:10115' associated with a public (e.g., external) network. Continuing with this example, prior to sending the datagram to receiver endpoint 204, firewall/NAT 202 may be configured to change the source address information in the clock lease message from '192.168.0.2:10115' to an external IP address and port '5.6.7.8:10115' such that reply messages are destined for firewall/NAT 202.

After receiving a clock lease message, receiver endpoint 204 may activate a timer based on the lease time in the clock lease message. For example, receiver endpoint 204 may start a timer that last 30 seconds as indicated by the clock lease message. In this example, when the timer has elapsed, receiver endpoint 204 may use clock related information to synchronize a clock or may generate an error and/or notify a test operator that clock synchronization failed.

At step 3, a clock lease reply message may be sent from receiver endpoint 204 to firewall/NAT 202. In some embodiments, a clock lease reply message may be for acknowledging a clock lease message and may include node identification information, such as a unique node name. In such embodiments, the unique node name may be usable for identifying clock related information and/or messages associated with receiver endpoint 204.

At step 4, the clock lease reply message may be sent from firewall/NAT 202 to sender endpoint 200. For example, firewall/NAT 202 may receive a clock lease reply message and perform network address translation such that the clock lease reply message reaches sender endpoint 200. In this example, after receiving a clock lease reply message, firewall/NAT 202 may determine that a mapping exists between an internal address (e.g., an IP address and port associated with sender endpoint 200) and a destination address in the clock lease reply message. In this example, prior to sending the datagram to sender endpoint 200, firewall/NAT 202 may be configured to change, using the mapping information, the destination address information in the clock lease reply message from '5.6.7.8:10115' to '192.168.0.2:10115'.

At step 5, a clock synchronization message may be sent from receiver endpoint 204 to firewall/NAT 202. In some embodiments, a clock synchronization message may be for requesting clock related information, e.g., a current time at sender endpoint 200, and may include a node identifier and/or other information for identifying the requesting entity.

At step 6, the clock synchronization message may be sent from firewall/NAT 202 to sender endpoint 200. For example, firewall/NAT 202 may receive a clock synchronization message and perform network address translation such that the clock synchronization message reaches sender endpoint 200.

After receiving a clock synchronization message, sender endpoint 200 may generate, obtain, or derive relevant clock related information for receiver endpoint 204. For example, receiver endpoint 204 may use a data structure to store and maintain information about entities that request clock related information. In this example, a unique identifier (e.g., a unique node name and/or IP address and port information) associated with receiver endpoint 204 may be usable to index the data structure and/or determine the information to provide.

At step 7, a clock synchronization reply message may be sent from sender endpoint 200 to firewall/NAT 202. In some embodiments, a clock synchronization reply message may be for providing clock related information associated with sender endpoint 200 and may include a node identifier and/or other information for identifying sender endpoint 200.

At step 8, the clock synchronization reply message may be sent from firewall/NAT 202 to receiver endpoint 204. For example, firewall/NAT 202 may receive a clock synchronization message and perform network address translation such that the clock synchronization reply message reaches receiver endpoint 204.

After receiving a clock synchronization reply message, receiver endpoint 204 may determine whether enough information is obtained to synchronize a relevant clock at receiver endpoint 204. If so, receiver endpoint 204 may use the obtained information to synchronize the clock. If information is still needed, receiver endpoint 204 may continue sending clock synchronization messages and receiving clock synchronization reply message, e.g., as long as a relevant lease time has not elapsed. If the relevant lease time has elapsed, receiver endpoint 204 may use clock related information to attempt to synchronize a clock or may generate an error and/or notify a test operator that clock synchronization failed.

In some embodiments, receiver endpoint 204 may be configured to exchange or attempt to exchange multiple clock synchronization related messages before synchronizing a clock at receiver endpoint 204. In such embodiments, receiver endpoint 204 or CSE 102 therein may use clock related information obtained from the multiple exchanges for performing clock synchronization. For example, as depicted in steps 9-12 of FIG. 2, prior to perform clock synchronization at receiver endpoint 204, a second clock synchronization message and a second clock synchronization reply message may be exchanged between receiver endpoint 204 and sender endpoint 200.

It will be appreciated that the communications depicted in FIG. 2 is for illustrative purposes and that different and/or additional actions may be used. It will also be appreciated that various actions described herein may occur in a different order or sequence. For example, step 4 and step 5 may occur concurrently or step 5 may occur before step 4.

Figure 3:
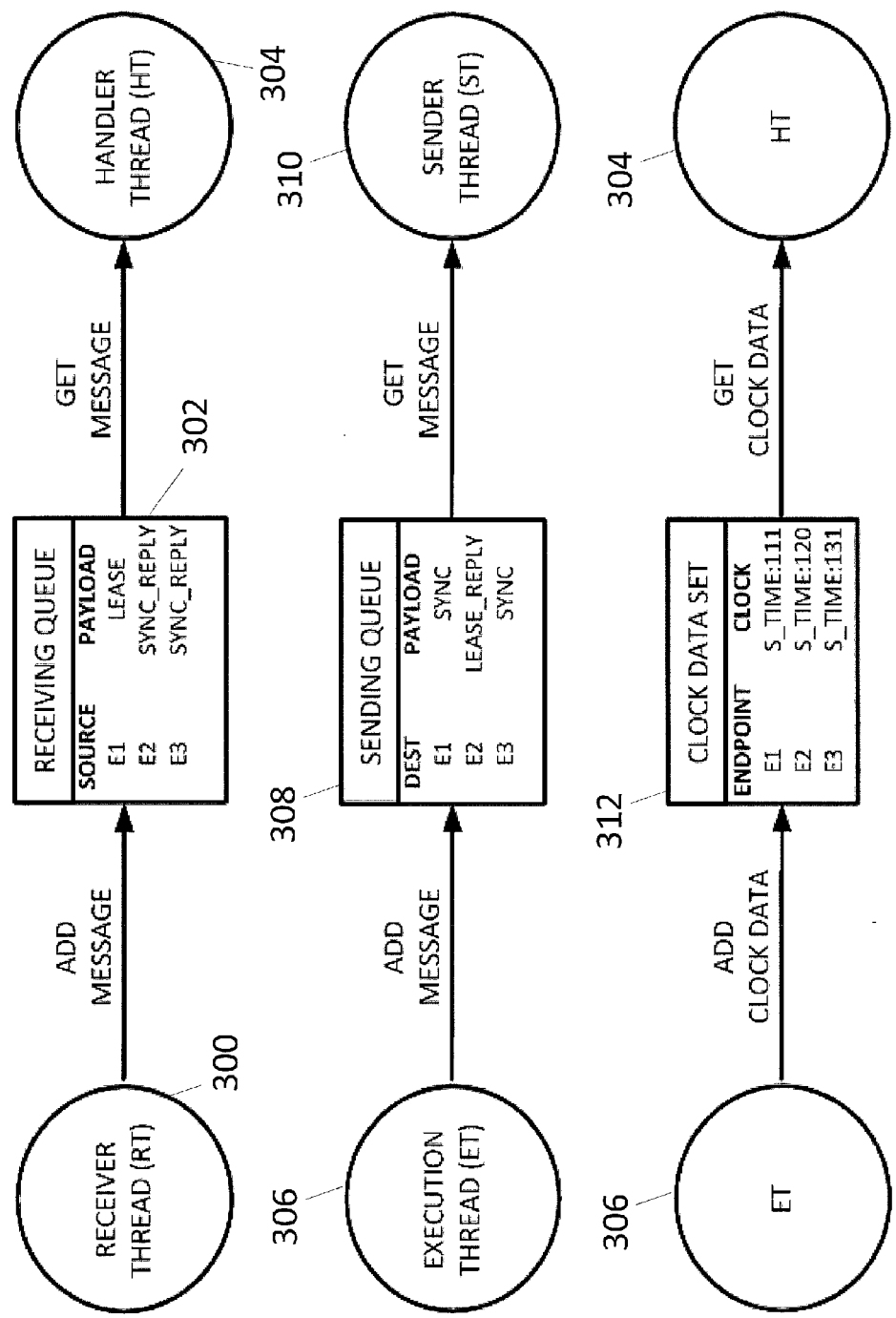
FIG. 3 is a diagram illustrating exemplary threads associated with clock synchronization according to an embodiment of the subject matter described herein.

FIG. 3 is a diagram illustrating exemplary threads associated with clock synchronization according to an embodiment of the subject matter described herein. In some embodiments, CSE 102 or a related entity (e.g., computing platform 100, computing platform 104, sender endpoint 200, and/or receiver endpoint 204) may utilize multiple threads or application instances to handle various aspects of clock synchronization. For example, one or more threads may be configured to receive clock synchronization related messages and place the messages in a queue or data structure. In another example, one or more threads may be configured to send clock synchronization related messages and place the messages in a queue or data structure. In yet another example, one or more threads may be configured to retrieve, obtain, and/or use clock related information.

In the embodiment illustrated in FIG. 3, a receiver thread (RT) 300, a receiving queue 302, a handler thread (HT) 304, an execution thread (ET) and/or an HT 306, a sending queue 308, a sender thread 310, and a clock data set 312 are depicted. In some embodiments, receiver endpoints and sender endpoints may each be executing versions of one or more of the depicted threads in FIG. 3. In such embodiments, each endpoint's threads may perform similar, corresponding, and/or different actions depending on various scenarios.

RT 300 may represent a service, an application, or a process (e.g., software executing on a processor) for receiving clock synchronization related messages (e.g., clock lease messages, clock lease reply messages, clock synchronization messages, and/or clock synchronization reply messages) and for storing the messages in receiving queue 302. In some embodiments, RT 300 may avoid inspecting and/or processing messages to avoid bottlenecks and/or related delays. In some embodiments, multiple RTs 300 may be utilized for one or more networks, segments, nodes, and/or test operators.

Receiving queue 302 may represent any suitable data structure for storing and/or queuing messages. In some embodiments, receiving queue 302 may be indexable or searchable using node identification information, e.g., a unique node name and/or an IP address and port information, and/or message type.

HT 304 may represent a service, an application, or a process (e.g., software executing on a processor) for processing received messages (e.g., datagrams) and performing one or more actions associated with the processed message. For example, HT 304 may obtain a message from receiving queue 302 and may perform one or more actions (e.g., adding messages to queues, retrieving messages from queues, and/or retrieving clock related information) depending on the type of message. In some embodiments, multiple HTs 304 may be utilized for one or more networks, segments, nodes, and/or test operators.

In some embodiments, HT 304 may obtain and process a message from receiving queue 302. For example (e.g., at sender endpoint 200), in response to obtaining a clock synchronization message from receiving queue 302, HT 304 may retrieve clock related information, generate a clock synchronization reply message including the clock related information, and may add the message to sending queue 308.

Execution thread (ET) 306 may represent a service, an application, or process (e.g., software executing on a processor) for performing one or more tests and/or performing one or more traffic related measurements. In some embodiments, sender endpoint 200 and receiver endpoint 204 may each execute at least one ET 306. At sender endpoint 200, ET 306 may initiate clock synchronization by sending a clock lease message to one or more nodes and/or generate and send test traffic to one or more nodes. At sender endpoint 200, ET 306 may perform clock synchronization, receive test traffic from one or more nodes, and use a synchronized in performing traffic related measurements.

Sending queue 308 may represent any suitable data structure for storing and/or queuing messages. In some embodiments, receiving queue 302 may be indexable or searchable using node identification information, e.g., a node identifier and/or an IP address and port information and/or message type.

ST 310 may represent a service, an application, or a process (e.g., software executing on a processor) for sending clock synchronization related messages and for storing the messages in sending queue 308. In some embodiments, multiple STs 310 may be utilized for one or more networks, segments, nodes, and/or test operators.

In some embodiments, ST 310 may set a destination address in each message to be sent, e.g., prior to sending the message. For example, if an endpoint is communicating with multiple peers, ST 310 may set a destination address in each message such that each peer is contacted and such that firewall/NAT 202 is triggered to open holes for communicating with the multiple peers.

Clock data set 312 may represent any suitable data structure for storing and/or queuing clock related information. In some embodiments, clock data set 302 may be indexable or searchable using node identification information, e.g., a node identifier and/or an IP address and port information.

For example, clock related information may be stored and indexed using an endpoint identifier (e.g., 'E1').

In some embodiments, RT 300 and ST 310 may each use a same port, address information, communications interface, and/or a communications socket. For example, RT 300 and ST 310 may share a single UDP datagram socket associated with a particular IP address and a particular port identifier. In such embodiments, such usage may be thread-safe since different and/or separate memory buffers may be used for sending and receiving messages via the socket.

In some embodiments, ET 306 and/or another entity (e.g., CSE 102) may perform clock synchronization initialization. For example, in a setup phase prior to the start of a test session and at sender endpoint 200, CSE 102 may spawn ET 306 for initiating clock synchronization (e.g., by triggering receiver endpoint 204 to start sending clock synchronization messages) and for sending test traffic to receiver endpoint 204. In this example, ET 306 may generate and queue a clock lease message destined for receiver endpoint 204 and may wait for a clock lease reply message to be received. After a clock lease reply is received, ET 306 and/or other entities (e.g., threads) may perform other operations or actions. Continuing with this example, once a lease time has elapsed, ET 306 and/or another entity may generate and send test traffic to receiver endpoint 204.

In another example, in a setup phase prior to the start of a test session and at receiver endpoint 204, CSE 102 may spawn ET 306 for performing clock synchronization (e.g., by exchanging clock related information), for receiving test traffic from sender endpoint 200, and/or for performing one or more traffic related measurements. In this example, ET 306 may wait for a clock lease message from sender endpoint 200 before generating and/or sending a clock lease reply message or a clock synchronization message. ET 306 may wait for a clock synchronization reply message. Once a clock synchronization reply message is received, ET 306 and/or another entity may inspect a related timer or other information for determining whether to send another clock synchronization message or attempting to synchronize a clock using obtained clock related information. Continuing with this example, once a lease time has elapsed or another threshold (e.g., a number of message exchanges) has been reached, ET 306 and/or another entity may use obtained clock related information for synchronizing a clock at receiver endpoint 204. ET 306 and/or other entity may also receive test traffic from sender endpoint 200 and may perform traffic related measurements using the synchronized clock.

In some embodiments, CSE 102 or one or more associated threads may initiate or perform clock synchronization periodically or aperiodically (e.g., dynamically), e.g., for avoiding clock drift and/or inaccurate traffic related measurements. In this example, at sender endpoint 200, CSE 102 or one or more associated threads may send clock lease messages to receiver endpoint 204 and may receive clock lease reply messages from receiver endpoint 204. The time interval between subsequent clock lease messages and the lease time associated with each clock lease message may be based on various factors (e.g., preconfigured settings, operator preferences, and/or dynamic information) and/or may vary (e.g., a time interval between clock synchronizations may increase and/or a lease time may decrease as a test session reaches the end of its execution period).

In some embodiments, CSE 102 or one or more associated threads may exchange clock synchronization messages periodically or aperiodically (e.g., dynamically), e.g., for gathering or obtaining clock related information. In this example, at receiver endpoint 204, CSE 102 or one or more associated threads may send clock synchronization messages to sender endpoint 200 and may receive clock synchronization reply messages from sender endpoint 200. The time interval between subsequent clock synchronization messages may be based on various factors (e.g., preconfigured settings, operator preferences, and/or dynamic information) and/or may vary (e.g., a time interval between clock synchronization messages may increase or decrease depending on a clock synchronization algorithm, a calculated clock drift amount, and/or other information).

In some embodiments, CSE 102 or one or more associated threads may perform clock synchronization after a first test session but prior to a second test session. For example, ET 306 may initiate and perform clock synchronization after a test session is completed. In this example, since clock synchronization initialization may take some time (e.g., 10 seconds or more) during which test execution is paused or blocked, by performing clock synchronization after a first test session is completed, a subsequent test session executed between the same peers may skip an initial clock synchronization and/or related initialization, thereby executing the subsequent test session faster than the first test session.

In some embodiments, HT 304 and/or ET 306 may generate and/or add messages to sending queue 308. For example (e.g., at receiver endpoint 204), HT 304 may generate and/or add clock synchronization messages destined for one or more peers (e.g., sender endpoints 200 and/or other endpoints) at some clock synchronization interval (e.g., every two minutes or after 30 test messages are exchanged). In this example, the clock synchronization interval may be calculated based on various factors, such as a clock synchronization algorithm and/or other information. In another example (e.g., at receiver endpoint 204), HT 304 may generate and/or add clock lease reply message to sending queue 308 after receiving a clock lease message from sender endpoint 200. In another example (e.g., at sender endpoint 200), HT 304 may generate and/or add a clock lease message to sending queue 308 for each endpoint (e.g., receiver endpoint 204 and/or other receivers) registered to sender endpoint 200. In some embodiments, HT 304 and/or ET 306 may parse or otherwise inspect a message to obtain a unique identifier (e.g., a unique node name) and clock related information from the message. In some embodiments, after obtaining a unique identifier and clock related information from a message, HT 304 and/or ET 306 may use the unique identifier as a key for adding the clock related information stored in a data structure, e.g., clock data set 312.

In some embodiments, HT 304 and/or ET 306 may use a unique identifier and/or other information as a key for retrieving clock related information stored in a data structure, e.g., clock data set 312. In some embodiments, HT 304 and/or ET 306 may synchronize a clock using obtained clock related information and may use the synchronized clock to perform one or more traffic related measurements.

It will be appreciated that entities depicted in FIG. 3 are for illustrative purposes and that different and/or additional threads and/or data structures may be used.

Figure 4:
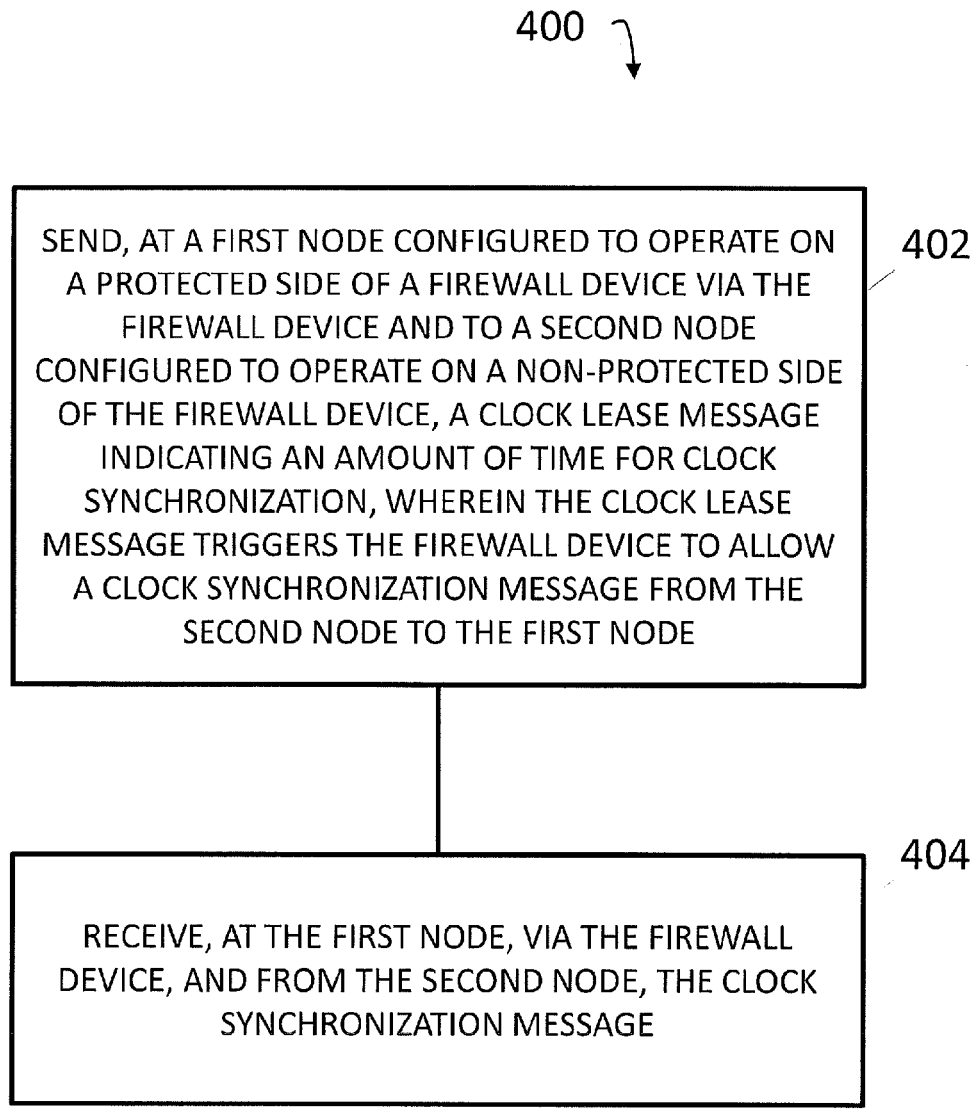
FIG. 4 is a diagram illustrating an exemplary process for receiving a clock synchronization message according to an embodiment of the subject matter described herein.

FIG. 4 is a diagram illustrating an exemplary process 400 for receiving a clock synchronization message according to an embodiment of the subject matter described herein. In some embodiments, the exemplary process, or portions thereof, may be performed by or at computing platform 100, computing platform 104, CSE 102, sender endpoint 200, receiver endpoint 204, and/or another node or module. In some embodiments, exemplary process 400 may include steps 402 and/or 404.

Referring to process 400, at step 402, a clock lease message indicating an amount of time for clock synchronization (e.g., a lease time) may be sent from a first node configured to operate on a protected side of a firewall device (e.g., sender endpoint 200) to a second node configured to operate on a non-protected side of the firewall device (e.g., receiver endpoint 204) via a firewall device (e.g., firewall/NAT 202), where the clock lease message may trigger the firewall device to allow a clock synchronization message from the second node to the first node.

At step 404, the clock synchronization message may be received from the second node via the firewall device.

In some embodiments, a clock synchronization reply message may be sent to a second node from a first node via the firewall device.

In some embodiments, a clock synchronization reply message may include clock synchronizing information usable for synchronizing a clock at a second node to a clock at a first node.

In some embodiments, a clock may be usable for measuring one way delay, jitter, mean opinion score (MOS), or a traffic related measurement. For example, by synchronizing a clock at receiver endpoint 204, receiver endpoint 204 may use timestamps associated with received test traffic from sender endpoint 200 to determine jitter, delay, and/or traffic or packet related statistics.

In some embodiments, a clock lease message may include a unique identifier (e.g., a name or IP address and/or port) identifying the first node.

In some embodiments, a clock lease reply message may be sent to the first node for acknowledging the clock lease message and may include a unique identifier identifying the second node. For example, a second node may send a clock lease reply message in response to receiving a clock lease message from a first node and prior to sending a clock synchronization message.

In some embodiments, a clock lease message may be sent using a first port associated with a first node and a clock synchronization message may be received using the first port associated with the first node.

In some embodiments, after an amount of time (e.g., a lease time indicated in a clock lease message) for clock synchronization has elapsed, another clock lease message may be sent from a first node to a second node via a firewall device. For example, sender endpoint 200 may generate clock lease messages whenever clock synchronization should occur. In this example, clock synchronization may occur based on various factors, including clock drift, time, operator preferences, and/or other information.

In some embodiments, clock synchronization may occur before, during, or after a test session involving sending traffic between the first node and the second node. For example, sender endpoint 200 or another entity may initiate clock synchronization at receiver endpoint 204 prior to starting a test session. In this example, the test session may be paused for additional clock synchronization, e.g., if sender endpoint 200 or another entity determines that a threshold time period has been reached without performing clock synchronization and/or that substantial clock drift may have occurred. In another example, sender endpoint 200 or another entity may initiate clock synchronization after a test session is completed. In this example, if a second test session is initiated soon after the clock synchronization, additional clock synchronization may not be needed, thereby allowing the second test session to be initiated and/or completed faster.

In some embodiments, a second node for sending a clock synchronization message and/or measuring traffic related may include a test platform or a test device.

It will be appreciated that exemplary process 400 is for illustrative purposes and that different and/or additional actions may be used. It will also be appreciated that various actions described herein may occur in a different order or sequence.

It should be noted that computing platform 100, CSE 102, computing platform 104, send and/or functionality described herein may constitute a special purpose computing device. Further, computing platform 100, CSE 102, computing platform 104, and/or functionality described herein can improve the technological field of testing network nodes by providing mechanisms for performing clock synchronization based on a clock in a live and/or protected network and using that information to accurately perform traffic related measurements associated with traffic sent from the live and/or protected network.

The subject matter described herein for receiving a clock synchronization message improves the functionality of test platforms and/or test tools by providing mechanisms for receiving clock related information from one or more nodes in a protected network (e.g., nodes located behind a firewall/NAT 106) with little or no modification to intermediate security related devices. It should also be noted that a computing platform that implements subject matter described herein may comprise a special purpose computing device (e.g., a traffic generator) usable to send and/or receive a clock synchronization related message.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for receiving a clock synchronization message, the method comprising:
    at a first node configured to operate on a protected side of a firewall device:
        sending, via the firewall device and to a second node configured to operate on a non-protected side of the firewall device, a clock lease message indicating an amount of time for clock synchronization, wherein the clock lease message triggers the firewall device to allow clock synchronization messages from the second node to the first node to traverse the firewall for the amount of time indicated in the clock lease message while discarding other messages from the second node that are directed to the first node; and
        receiving, via the firewall device and from the second node, a clock synchronization message, wherein the clock synchronization message traverses the firewall during the amount of time for clock synchronization indicated in the clock lease message.

2. The method of claim 1 comprising:
    sending, via the firewall device and to a second node, a clock synchronization reply message.

3. The method of claim 2 wherein the clock synchronization reply message includes clock synchronizing information usable for synchronizing a clock at the second node to a clock at the first node.

4. The method of claim 3 wherein the clock is usable for measuring one way delay, jitter, mean opinion score (MOS), or a traffic related measurement.

5. The method of claim 1 wherein the clock lease message includes a unique identifier identifying the first node.

6. The method of claim 1 comprising:
    receiving, from the second node, a clock lease reply message acknowledging the clock lease message and including a unique identifier identifying the second node.

7. The method of claim 1 wherein the clock lease message is sent using a first port associated with the first node and the clock synchronization message is received using the first port associated with the first node.

8. The method of claim 1 comprising:
    after the amount of time for clock synchronization has elapsed, sending, via the firewall device and to a second node, another clock lease message.

9. The method of claim 1 wherein clock synchronization occurs before, during, or after a test session involving sending traffic between the first node and the second node.

10. The method of claim 1 wherein the second node includes a test platform or a test device.

11. A system for receiving a clock synchronization message, the system comprising:
    a first node configured to operate on a protected side of a firewall device, the first node comprising:
        at least one processor;
        a memory; and
        a clock synchronization engine (CSE) implemented using the at least one processor and the memory, wherein the CSE is configured to:
            send, via the firewall device and to a second node configured to operate on a non-protected side of the firewall device, a clock lease message indicating an amount of time for clock synchronization, wherein the clock lease message triggers the firewall device to allow clock synchronization messages from the second node to the first node to traverse the firewall for the amount of time indicated in the clock lease message while discarding other messages from the second node that are directed to the first node; and
            receive, via the firewall device and from the second node, a clock synchronization message, wherein the clock synchronization message traverses the firewall during the amount of time for clock synchronization indicated in the clock lease message.

12. The system of claim 11 wherein the first node is configured to send, via the firewall device and to a second node, a clock synchronization reply message.

13. The system of claim 12 wherein the clock synchronization reply message includes clock related information usable for synchronizing a clock at the second node to a clock at the first node.

14. The system of claim 13 wherein the clock is usable for measuring one way delay, jitter, mean opinion score (MOS), or a traffic related measurement.

15. The system of claim 11 wherein the clock lease message includes a unique identifier identifying the first node.

16. The system of claim 11 wherein the second node is configured to receive, from the second node, a clock lease reply message acknowledging the clock lease message and including a unique identifier identifying the second node.

17. The system of claim 11 wherein the clock lease message is sent using a first port associated with the first node and the clock synchronization message is received using the first port associated with the first node.

18. The system of claim 11 wherein the first node is configured to:
after the amount of time for clock synchronization has elapsed, send, via the firewall device and to a second node, another clock lease message.

19. The system of claim 11 wherein clock synchronization occurs before, during, or after a test session involving sending traffic between the first node and the second node.

20. The system of claim 11 wherein the second node includes a test platform or a test device.

21. A non-transitory computer readable medium comprising computer executable instructions embodied in the computer readable medium that when executed by at least one processor of a computer perform steps comprising:
at a first node configured to operate on a protected side of a firewall device:
sending, via the firewall device and to a second node configured to operate on a non-protected side of the firewall device, a clock lease message indicating an amount of time for clock synchronization, wherein the clock lease message triggers the firewall device to allow clock synchronization messages from the second node to the first node to traverse the firewall for the amount of time indicated in the clock lease message while discarding other messages from the second node that are directed to the first node; and
receiving, via the firewall device and from the second node, a clock synchronization message, wherein the clock synchronization message traverses the firewall during the amount of time for clock synchronization indicated in the clock lease message.

* * * * *